W. H. KELLER.
MOTOR SUCTION PUMP.
APPLICATION FILED FEB. 17, 1909.
975,532.
Patented Nov. 15, 1910.
2 SHEETS—SHEET 1.
FIG. I.
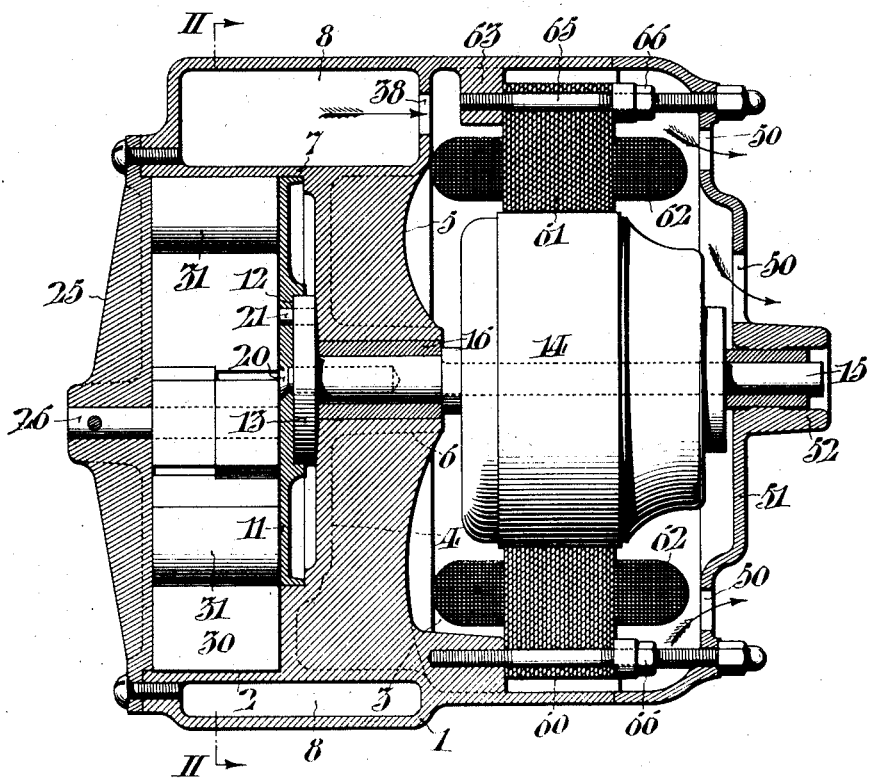
WITNESSES:
INVENTOR:
William H. Keller.
by his Attorneys W. H. KELLER.
MOTOR SUCTION PUMP.
APPLICATION FILED FEB. 17, 1909.
975,532.
Patented Nov. 15, 1910.
2 SHEETS—SHEET 2.
FIG. II.
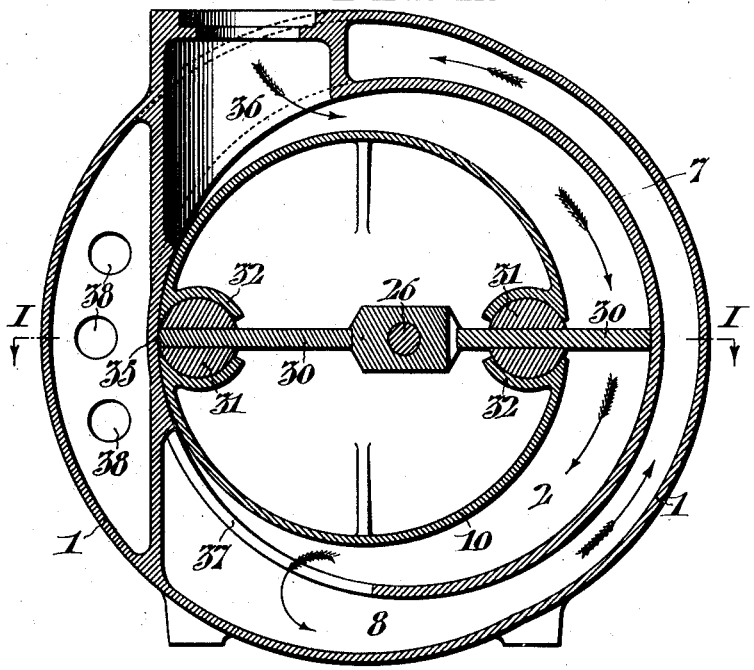
FIG. III.
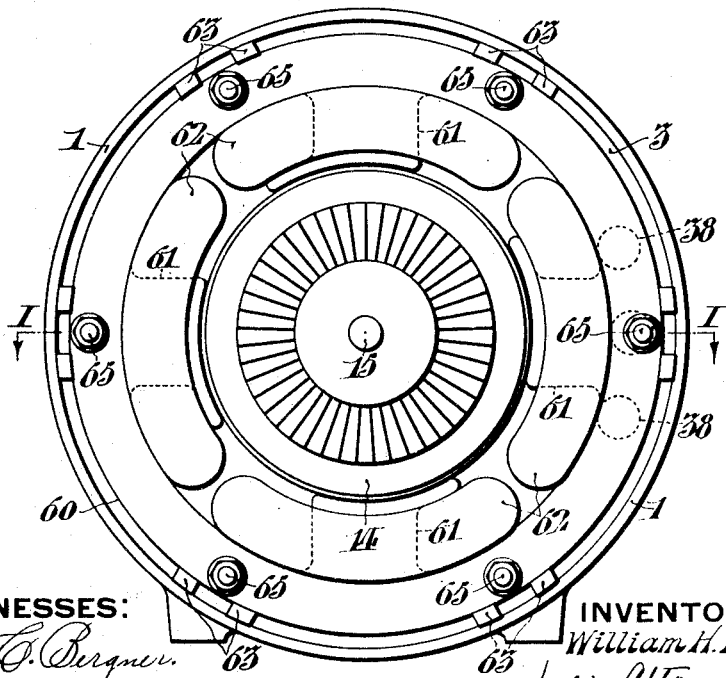
WITNESSES:
John C. Bergner.
James H. Bell
INVENTOR:
William H. Keller;
by his Attorneys
Tulley & Paul

UNITED STATES PATENT OFFICE.

WILLIAM H. KELLER, OF PHILADELPHIA, PENNSYLVANIA, ASSIGNOR TO KELLER MANUFACTURING COMPANY, OF PHILADELPHIA, PENNSYLVANIA, A CORPORATION OF DELAWARE.

MOTOR SUCTION-PUMP.

975,532.

Specification of Letters Patent. Patented Nov. 15, 1910.

Application filed February 17, 1909. Serial No. 478,424.

*To all whom it may concern:*

Be it known that I, WILLIAM H. KELLER, of Philadelphia, in the county of Philadelphia and State of Pennsylvania, have invented certain new and useful Improvements in Motor Suction-Pumps, whereof the following is a specification, reference being had to the accompanying drawings.

In an application filed by me under date of January 16th, 1909, Serial Number 472,572, I have shown and described a form of rotary suction pump which I have found admirably adapted to employment in vacuum cleaners and other similar apparatus.

It is the object of the present invention to directly and coaxially combine a suction pump of that type with an electric motor, in such a way as to secure the highest efficiency and the greatest compactness and strength. To this end the rotary suction pump and the electric motor are not only coaxially mounted, but are contained within the same casing and employ a common central journal. A circuitous muffler passage surrounds the pump and the exhaust from the pump is led first through this passage and is then driven back into the motor chamber where it circulates so as to assist in cooling the coils of the motor, an important consideration in a motor running at the high speed required for direct connection with a rotary pump of this character.

The other details of construction to which my invention relates will be made clear by the specification which follows:—

In the accompanying drawings, Figure I, is a plan section of a motor pump conveniently embodying my invention. This longitudinal section is also indicated by the line I, I, in Fig. II. Fig. II, is a cross section taken on the line II, II, in Fig. I. Fig. III, is an elevation looking from the right of Fig. I, and with the motor hood removed.

In the said figures, 1, designates a substantially cylindrical casing which is internally divided into a pump chamber 2, and a motor chamber 3, by means of a partition 4, which is reinforced by radial webs 5, which extend from a central bearing 6, to the wall 7, which is common to the said chambers 2, and 3, and divides them from a peripheral passage 8, also included within the casing 1.

Eccentrically mounted within the pump chamber 2, is the hollow cylindrical drum or piston 10, of which the end wall 11, is provided with a central recess 12, within which is seated the circular disk 13, formed on the end of a shaft 15, which is journaled within a sleeve 16, supported in the central bearing 6, on the partition 4. The other part of this shaft carries the armature 14, of the motor. The said disk 13, on the shaft 15, is secured to the piston by means of a screw 20, and is prevented from rotating relatively thereto by a pin 21. The cover plate or cap 25, of the pump chamber 2, supports a pin 26, which is located concentrically with respect to the said chamber, but eccentrically in relation to the drum, and forms a pivot for fans or blades 30, swinging thereon. The said fans or blades slide within the split rocking pins 31, which are rotatably mounted within slotted sockets 32, formed within the drum 10, in proximity to its periphery.

It will be seen by reference to Fig. II, that as the blades 30, are rotated within the chamber 2, by the motion of the drum 10, the said blades and the rocking pins 31, will slide relatively to each other to compensate for the eccentricity of the said drum 10, with respect to the chamber 2. As the drum 10, rotates it is always in tangential contact with the inner periphery of the chamber 2, at the point 35. This acts as a seal between the suction port 36, and exhaust port 37, of the chamber 2. The blades 30 are in constant contact with the walls of the pump chamber and will therefore, positively force the air through the pump. As the blades 30, are rotated in a clock-wise direction, the air is drawn through port 36, as indicated by the arrows in Fig. II, and exhausted through the port 37, into the peripheral chamber 8, which surrounds the chamber 2. The said chamber 8, acts as a muffler, and communicates with the motor chamber 3, through the apertures 38. The exhausted air is thereby utilized to cool the motor which is very essential in a high speed motor of the type used for this purpose, and ultimately escapes through the apertures 50, in the hood 51, which forms the cover or cap for the motor chamber and comprises a bearing 52, within which the outer end of the shaft 15, is journaled.

In order to minimize the weight of the apparatus, I cast the casing 1, of a comparatively light metal, preferably aluminum, thus occasioning the necessity of constructing the field frame of the motor separately. I prefer to build up the field frame 60, of the motor of stamped laminations, having the usual pole pieces 61, which are surrounded by the magnetizing coils 62, as clearly shown in Figs. I, and III. The field frame 60, fits snugly between a series of lugs 63, cast integrally with the casing 1, on its inner periphery and is secured thereto by means of stud bolts 65, which are provided with nuts 66, and after passing through apertures in the said field frame, are threaded into the said lugs 63. The spaces thus allowed between the frame 60, the inner periphery of the casing 1, and lugs 63, afford passages for the exhaust air of the pump by means of which the magnetizing coils are effectively cooled.

Having thus described my invention, I claim:—

1. A motor suction pump comprising a casing, a partition located within said casing intermediate its ends, a cap for closing one end of said casing and forming a pump chamber, a rotary piston located within said chamber and having means for engaging the walls of said chamber for positively forcing air through said pump, an inlet port leading to said pump chamber, an exhaust port leading from said chamber through said partition to the other side thereof a motor mounted on the opposite side of said partition from said pump chamber, a cap for the other end of said casing, openings formed in said cap forming an outlet for the exhaust from said pump.

2. A motor suction pump comprising a casing, a partition located intermediate the ends of said casing, a pump chamber on one side of said partition, a rotary piston mounted in said chamber and having means for engaging the walls of said chamber for positively forcing air through said pump, a motor located within said casing on the other side of said partition, said casing having passages formed therein and connecting said pump chamber with the chamber for the motor, said motor including a field frame separated from the casing so as to provide a passage for the exhaust air from the pump, a rotating armature and a common shaft for supporting said rotary piston and said rotary armature.

3. A casing for a motor suction pump cylindrical in form and provided with a central partition dividing it into two parallel chambers, one for an electric motor and the other for the rotary pump; separate cover parts fastened to the ends of the casing; and a circuitous muffler passage formed within the walls of that part of the casing which surrounds the pump through which the exhaust from the pump is discharged into the compartment which contains the motor.

In testimony whereof, I have hereunto signed my name, at Philadelphia, Pennsylvania, this thirteenth day of February 1909.

WILLIAM H. KELLER.

Witnesses:
JAMES H. BELL,
E. L. FULLERTON.